United States Patent [19]

Korbmacher et al.

[11] Patent Number: 5,514,963
[45] Date of Patent: May 7, 1996

[54] METHOD FOR MONITORING AN AREA OF THE SURFACE OF THE EARTH

[75] Inventors: Wolfgang Korbmacher, Wedemark; Uwe Scharf, Sindelfingen, both of Germany

[73] Assignee: Prakla-Seismos GmbH, Hanover, Germany

[21] Appl. No.: 137,287

[22] Filed: Oct. 14, 1993

[30] Foreign Application Priority Data

Oct. 26, 1992 [DE] Germany .......................... 42 35 963.5

[51] Int. Cl.⁶ ................................ G01V 3/02; G01V 3/04
[52] U.S. Cl. ............................................ 324/357; 324/354
[58] Field of Search .................................... 324/347, 348, 324/352, 354, 357, 363, 364, 349, 350, 351, 355, 360

[56] References Cited

U.S. PATENT DOCUMENTS

| | | | |
|---|---|---|---|
| 2,917,704 | 12/1959 | Arps | 324/352 |
| 3,810,000 | 5/1974 | Aspinall et al. | 324/357 |
| 4,296,379 | 10/1981 | Yoshizumi | 324/347 |
| 4,752,881 | 6/1988 | Griffiths et al. | 324/347 |
| 4,760,340 | 7/1988 | Denzau et al. | 324/348 |
| 4,804,906 | 2/1989 | Hamberg et al. | 324/347 |
| 4,875,015 | 10/1989 | Ward | 324/357 |
| 5,200,705 | 4/1993 | Clark et al. | 324/347 X |

FOREIGN PATENT DOCUMENTS

| | | |
|---|---|---|
| 0477167 | 3/1992 | European Pat. Off. . |
| 392189 | 3/1924 | Germany . |
| 962105 | 4/1957 | Germany . |

*Primary Examiner*—Sandra L. O'Shea
*Assistant Examiner*—Roger Phillips
*Attorney, Agent, or Firm*—Walter C. Farley

[57] ABSTRACT

A method for monitoring an area of the surface of the earth uses measurement probes arranged in a grid for determining the self-potential with respect to a base probe. The measurement probes are interrogated repeatedly. The earth resistance between measurement probes and the base probe is also measured repeatedly between measurements of self-potential. Potentials on the surface of an area of the earth can be determined precisely, independently of earth-resistance changes.

5 Claims, 13 Drawing Sheets

0 min

+15 min

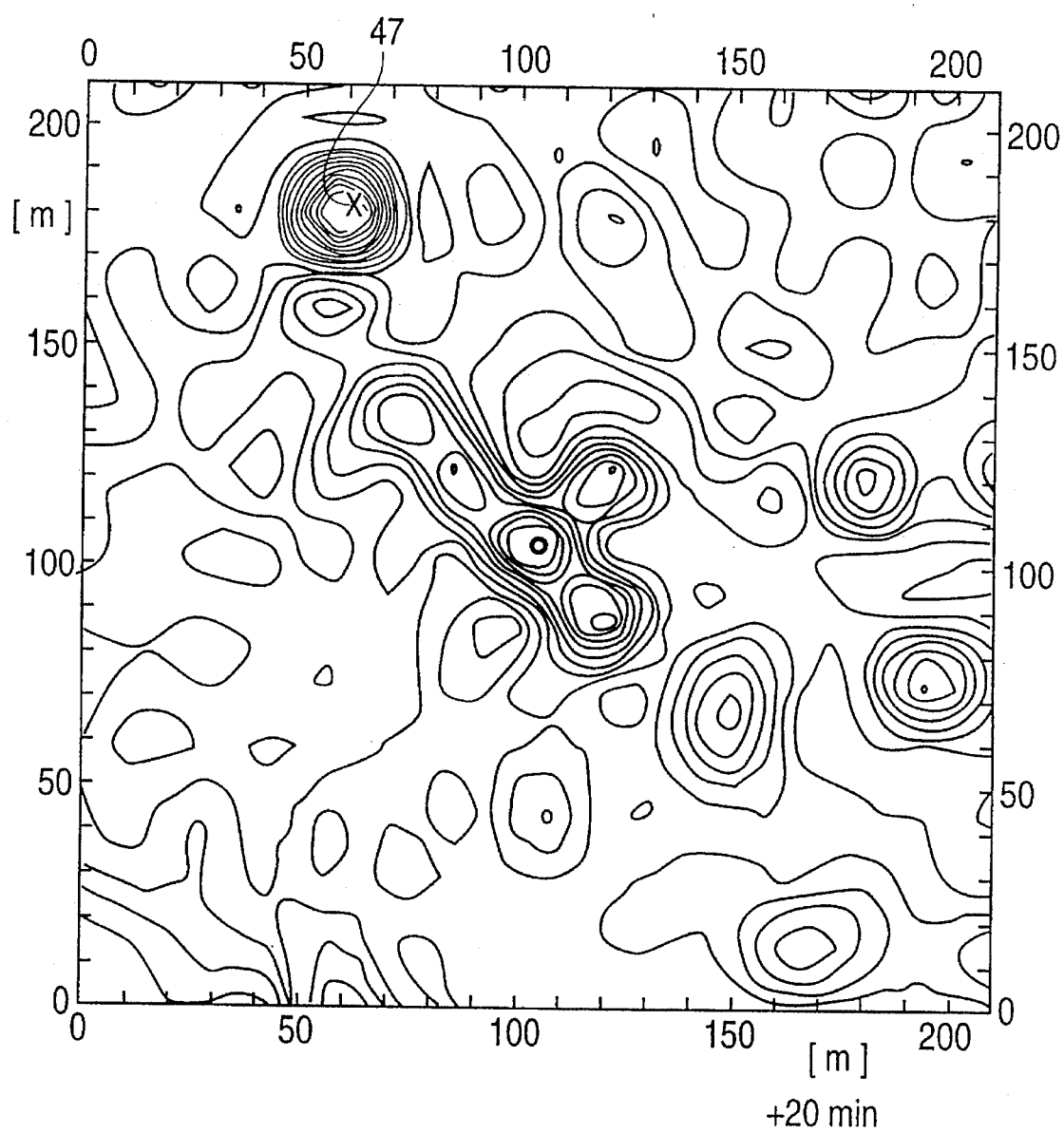

+25 min

+40 min

+85 min

+90 min

AFTER FRAC

METHOD FOR MONITORING AN AREA OF THE SURFACE OF THE EARTH

FIELD OF THE INVENTION

This invention relates to a method for monitoring an area of the earth's surface using measurement probes to determine electrical characteristics of the area and particularly to detect and evaluate dynamic changes in such electrical characteristics.

BACKGROUND OF THE INVENTION

It has been known for a long time to measure potentials on the surface of an area of the earth and that the potentials give information on the strength and course of subterranean disturbances, especially dynamic changes. For example, it is known, for this purpose, to pass high currents into the bedrock and to successively measure potentials in the region around the current introduction point. It is furthermore known to determine self-potentials with respect to a base probe.

Determination of the potentials can yield good results particularly during dynamic bedrock changes such as in artificial fracture production. Breaking the rock by means of hydraulic pressure results in seismic or seismic-acoustic events and electrical conductivity changes. In particular, filtration potentials and potentials on the basis of a geochemical change in bore flushing liquid are produced as the result of injecting liquid or steam into the rock formation at high pressure and in a short time. In conjunction with this, an electrolyte is compressed by the rock capillaries which act like a diaphragm. The electrochemical double layer which originally exists in solid/fluid form on the boundary surface is in consequence decomposed into a stationary part and a non-stationary diffusive part. This results in a potential difference as a consequence of the electrical charges between the ends of the capillaries.

However, the potentials to be measured at the surface are very small.

Naturally and artificially produced disturbance signals result from telluric currents which are caused, for example, by industrial or railway systems and whose amplitudes are above the order of magnitude of the potential differences to be measured. Known methods can thus be used only to a limited extent for detecting changes in conditions in the bedrock.

EP 477,167 discloses a method for monitoring an area wherein the potential is measured by means of probes at a plurality of measurement points in the area and is converted into electrical signals, the signals being interrogated and processed at specific time intervals by a central computer unit. The measurement points are in this case arranged at predetermined intervals along a closed line which encloses the area. In addition, a number of measurement points are provided underneath the area. This known method can be used, in particular, for detecting waste dumps in terms of potential. This method is based on measuring long-term changes in the condition of a dump. It relates to measuring potential differences from one measurement to the next measurement without being able to make any statement about the absolute condition of the area.

German patent document 962,105 discloses a method for locating and prospecting for usable deposits in the ground with the aid of self-potential measurements, a current conductor having a high controllable resistance being connected in parallel with the input of the potential test set after measuring the self potential of the ground to be investigated. That resistance value is determined at which the potential of the ground, when the resistance is switched on, falls to a fraction of the potential value measured without current consumption.

German 392,189 also discloses a method for determining the earth resistance in conjunction with potential measurements.

German 3,529,189 discloses a method for determining limits of subterranean deposits which are filled with hydrocarbons wherein measurement probes are arranged in a grid and self-potential curves are detected.

SUMMARY OF THE INVENTION

An object of the present invention is to provide a method for monitoring an area using self-potential measurement and in which method the influence of telluric currents is largely precluded and good accuracy and reliability of the determined results can be achieved.

The method according to the invention is distinguished in particular by the fact that, in addition to determining potentials at individual measurement probes, the earth resistance between the same measurement probe and a base probe is determined in each case immediately before or after a measurement. Thus, not just the value of the self-potential but, in particular, the value of the currents flowing are used for evaluation, the earth resistance value being taken into account in the self-potential measurement.

The measurement probes are preferably arranged in mutually parallel groups along measurement lines. In one example which is described in detail, each group contains 16 measurement probes and there are a total of 16 groups, resulting in a total number of 256 measurement probes.

Each group of measurement probes is allocated a memory unit in which the simultaneously detected potential values of the measurement probes of the associated group are buffer stored. In this case, all measurement probes of the entire grid are interrogated simultaneously so that there are 16 measurements in each memory unit at the same moment in time, which measurements are buffer-stored. These buffer stored values are then transmitted periodically to a central processor unit. This allows the condition of the potential of all the measurement probes laid out to be determined at a single point in time. The measurement data can then be transmitted to the central processor unit repeatedly, between two successive measurements.

Specifically, the earth resistance is measured immediately before or after each measurement of the self-potentials. This results in a tight time allocation of the potential measurement to the earth-resistance measurement. Although the earth resistance is not measured at the same time as the self-potential measurement, the time changes in the earth resistance are, however, as a rule smaller than the changes in the potential values within the time interval considered.

The earth resistance is likewise measured with the aid of measurement probes and the results are transmitted to the memory units and buffer-stored in the same way as the potential values. they can then be transmitted repeatedly to the central processor unit. In order to achieve a high measurement cycle time, it can also be provided for the earth resistance measurement not to be carried out until after a relatively large number of potential measurements.

The determined self-potentials of the measurement probes are preferably transmitted in analog form to the associated memory units of a group. In consequence, analog/digital converters on each individual probe can be avoided. Furthermore, central filters, such as low-pass filters, can be used in a memory unit. The filtering can also be carried out in the digital area, subsequent to the buffer storage. The measurements of the earth-resistance measurement are likewise transmitted in analog form to the associated memory unit and are transmitted repeatedly to the central processor unit after analog/digital conversion. The repeated transmission of the self-potential values and earth-resistance values from the memory units to the central processor unit preferably takes place in digital form, using time-division multiplexing. The interrogation time for one group of measurement probes is preferably 0.5 milliseconds (ms). The cycle of transmission of data from the memory units to the central processor unit takes place in a time of less than 10 sec., typically in 2 sec.

In order to measure the earth resistance, a reference voltage is preferably applied between the base probe and the respective measurement probes. At the same time, the voltage dropped across a measurement resistor is determined and the earth resistance is calculated from this.

The measurement probes are, in particular, probes which cannot be polarized.

For evaluation, the determined self-potentials are assessed using the determined earth resistance and are presented in the form of iso-lines on a map of the area. It can be provided that difference potentials between adjacent measurement probes be used rather than the absolute potential values at the individual measurement probes in order to preclude telluric current effects.

The invention allows highly accurate detection of the self-potential distribution over an area at points in time which can be determined precisely in time with disturbance signals and earth resistance changes largely being precluded.

BRIEF DESCRIPTION OF THE DRAWINGS

The invention is explained in more detail in the following text with reference to the accompanying drawings wherein:

FIGS. 6A–6H are iso-potential maps of the surface of a monitored area showing results of the measurement of a fracturing process.

DESCRIPTION OF THE PREFERRED EMBODIMENT

Figure 1:
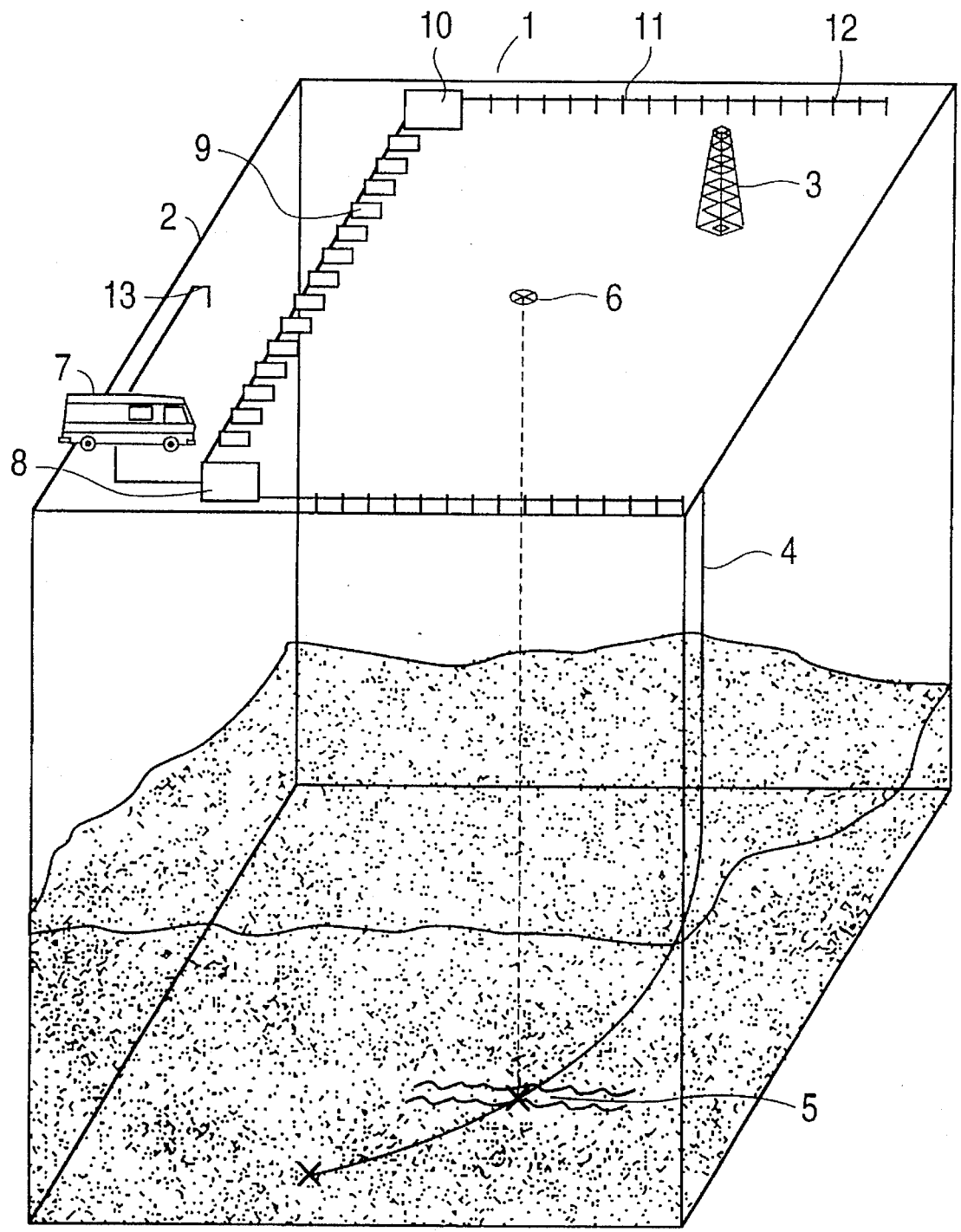
FIG. 1 is a schematic perspective view of a section of the earth with a measuring arrangement disposed on the surface thereof.

FIG. 1 schematically shows a typical section of the earth with a surface area having edges 1 and 2 and with a measuring arrangement disposed on the surface of the ground in this area. A drilling string 4 extends from a derrick 3 into an oil-bearing sandstone in which it is intended to break up the sandstone in a fracture region 5. The vertical projection of the fracture point on the surface is indicated at numeral 6. A central computer controller, including a central processor unit and evaluation devices, is accommodated in a measurement vehicle 7.

Sixteen memory units are uniformly spaced along a telemetry cable 9, the first memory unit being designated 8 and the last memory unit being indicated at 10. A cable 11, which leads to the individual measurement probes 12, is connected to memory unit 10 and also to every other memory unit, a total of 16 probes being arranged along cable 11. The complete measurement grid thus contains 256 probes. A base probe 13, which is likewise connected to the measurement vehicle, is arranged outside the measurement grid.

A current is fed in between the base probe and the individual measurement probes for earth-resistance measurement, while the potential measurement is carried out in a voltage-free manner between the base probe and the measurement probes. The range of intervals between one measurement of the potential and earth resistance measurements is between 0.5 ms and 1 minute.

Figure 2:
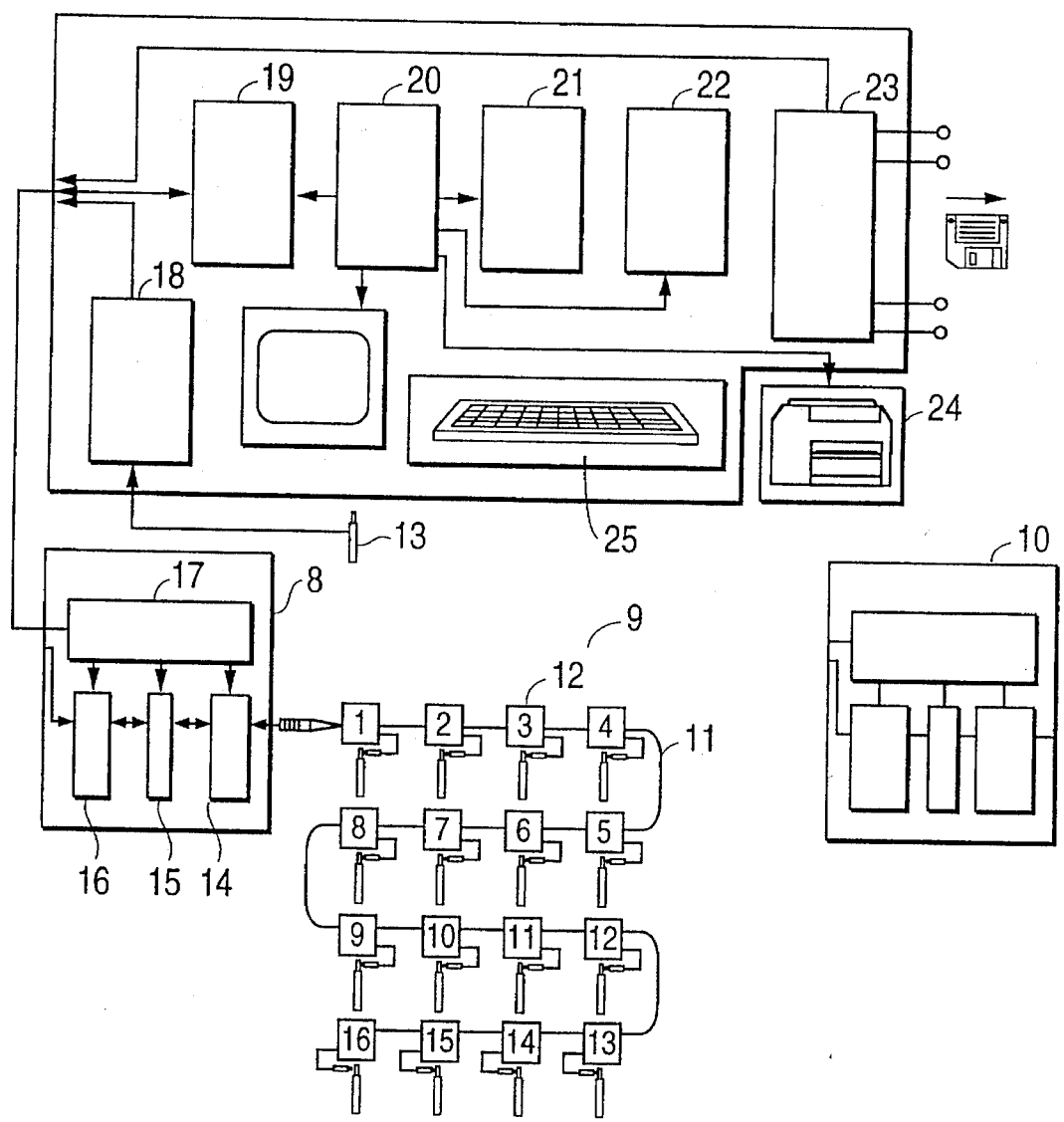
FIG. 2 is a schematic diagram illustrating measurement equipment usable to perform the method of the invention.

FIG. 2 shows a computer system which can be used. Cable 11 is shown to which 16 measurement probes 12 are connected. Cable 11 leads to memory unit 8 which contains a 16-channel preamplifier with an analog filter 14 followed by a 12-bit analog/digital converter, a microprocessor 16 and a power supply unit 17. The signal filtering is preferably carried out in the analog domain, separately for each individual measurement probe. However, it is also possible to carry out the filtering at least partially on the digital signal.

The data determined from the 16 measurement probes are buffer-stored in memory unit 8 and are available for interrogation by the central computer.

A control unit 18 for earth-resistance measurements is provided in the central computer. Furthermore, the data interrogated from memory units 8 are transmitted by an RS232/485 converter 19 to a control computer 20 and can be stored on a hard disk 21. A floppy disk 22 and a power supply unit 23 are also provided. The results of the measurements can be printed out on a printer 24. The computer is operated with a keyboard 25. A monitor 26 is also provided for displaying measurement results and for controlling the computer.

Figure 3:
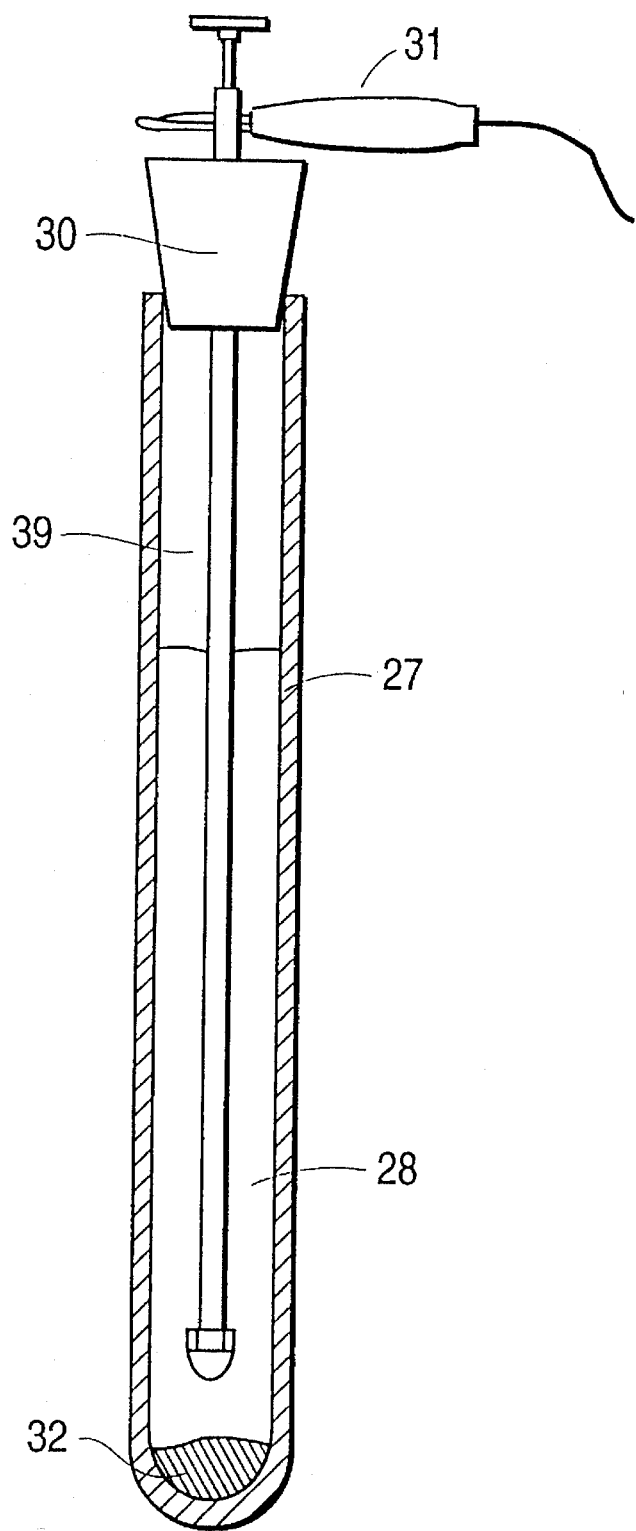
FIG. 3 is a side elevation, in section, of a measurement probe usable in performance of the method of the invention.

FIG. 3 shows a measurement probe which can be used. A hollow ceramic housing 27 is partially filled with a copper sulfate solution 28. Precipitated copper sulfate 32 collects at the lower end of the housing. A copper rod 29 is held at the upper end of the housing by a rubber plug 30 and extends downwardly into the copper sulfate solution. The measurement probe is connected to cable 11 by a connecting cable 31.

Figure 4:
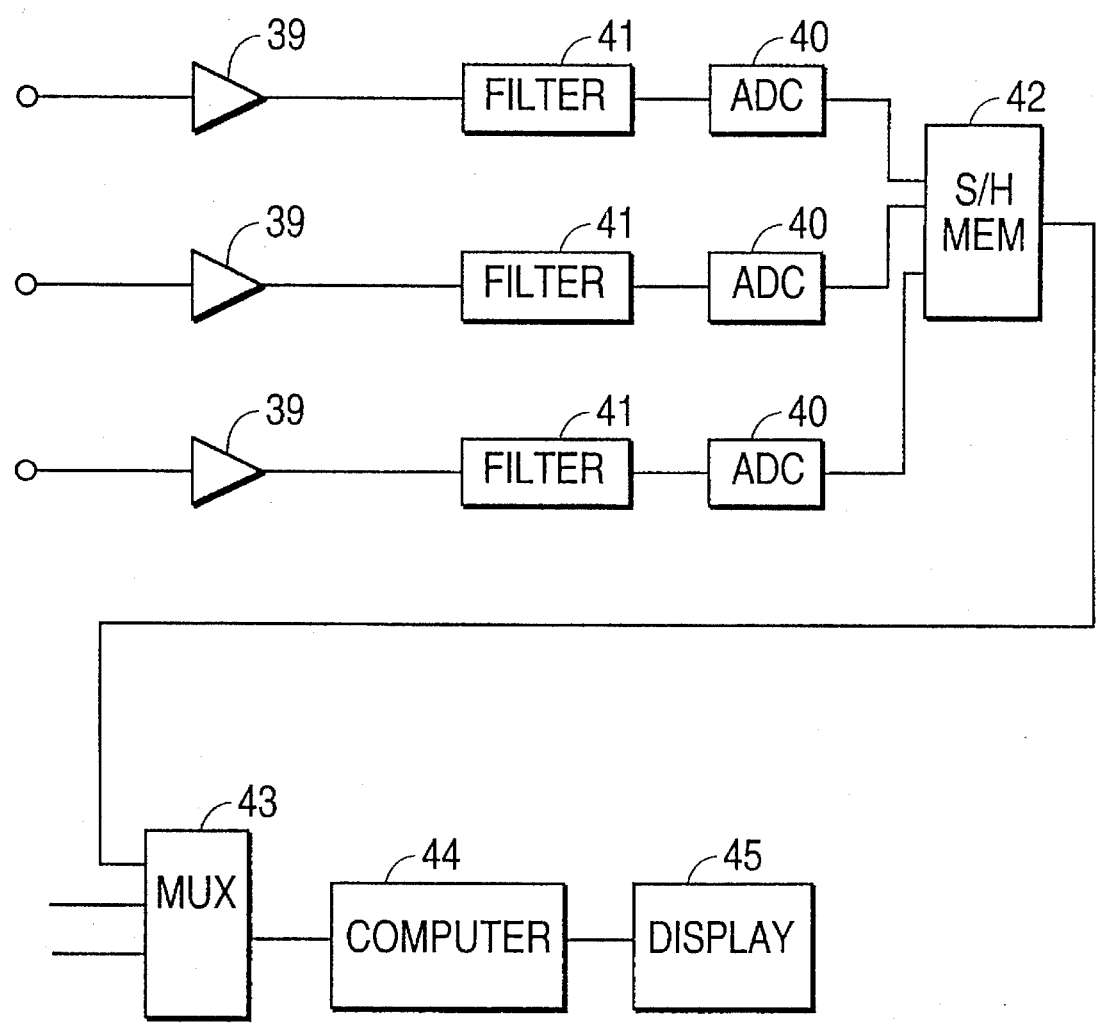
FIG. 4 is a schematic block diagram of a memory unit.

FIG. 4 is a schematic block diagram of a memory unit. Individual measurement probes are connected to an analog/digital converter 40 through dedicated preamplifiers 39 and filters 41. The outputs of all the analog/digital converters of a group lead to a sample and hold memory unit 42 which buffer-stores the data. From there, the data are passed repeatedly to control computer 44 by multiplex interrogation 43 and are shown on display unit 45.

Figure 5:
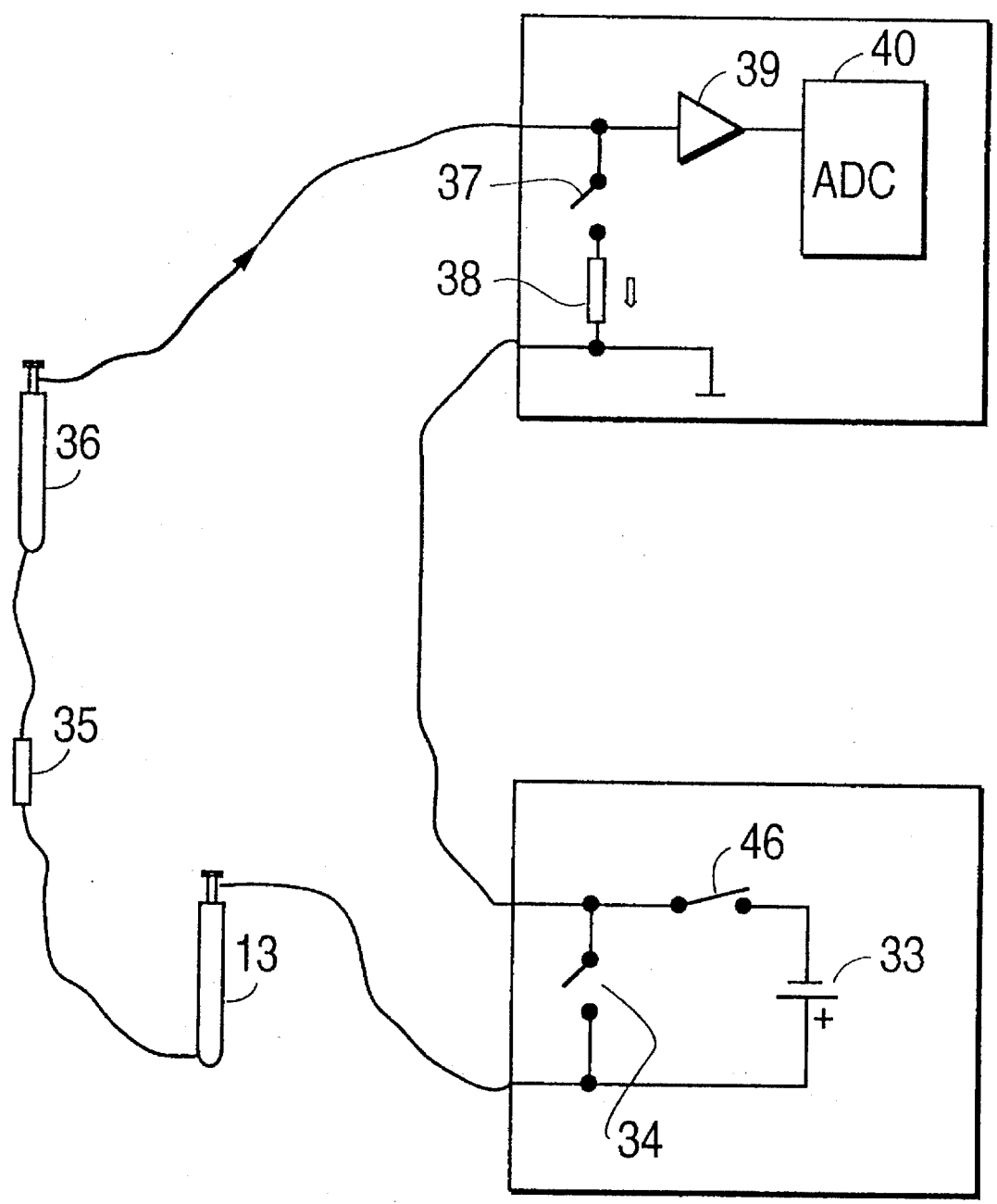
FIG. 5 is a schematic circuit diagram of an arrangement for making an earth resistance measurement.

FIG. 5 illustrates the principle of earth-resistance measurement. A DC voltage source 33 in series with a switch 46 is connected in a circuit which includes a base electrode 13, the resistance of the earth, which is symbolized by resistor 35, a measurement probe 36, a switch 37 and a measurement resistor 38. Switch 37 is closed during the earth-resistance measurement. Voltage dropped across resistor 38 is amplified by amplifier 39 and is passed to analog/digital converter 40 in the same way as potential-measurement data from the probe.

A switch 34 is in parallel with switch 46 and the source. While measuring the potentials on the measuring probes, switch 34 is closed and switch 46 is open. Switch 37 is open while measuring the potentials. The potential difference between base electrode 13 and measurement probe 36 is determined in the same way from the potential difference between the amplifier connection of amplifier 39 and ground.

The potentials determined can be evaluated directly, although it is preferred to use potential differences between adjacent probes for the evaluation in order to eliminate telluric currents in the bedrock from the measurement. It is in this case assumed that the telluric currents essentially act in the same way at the same time on all measurement probes.

Figure 6A:
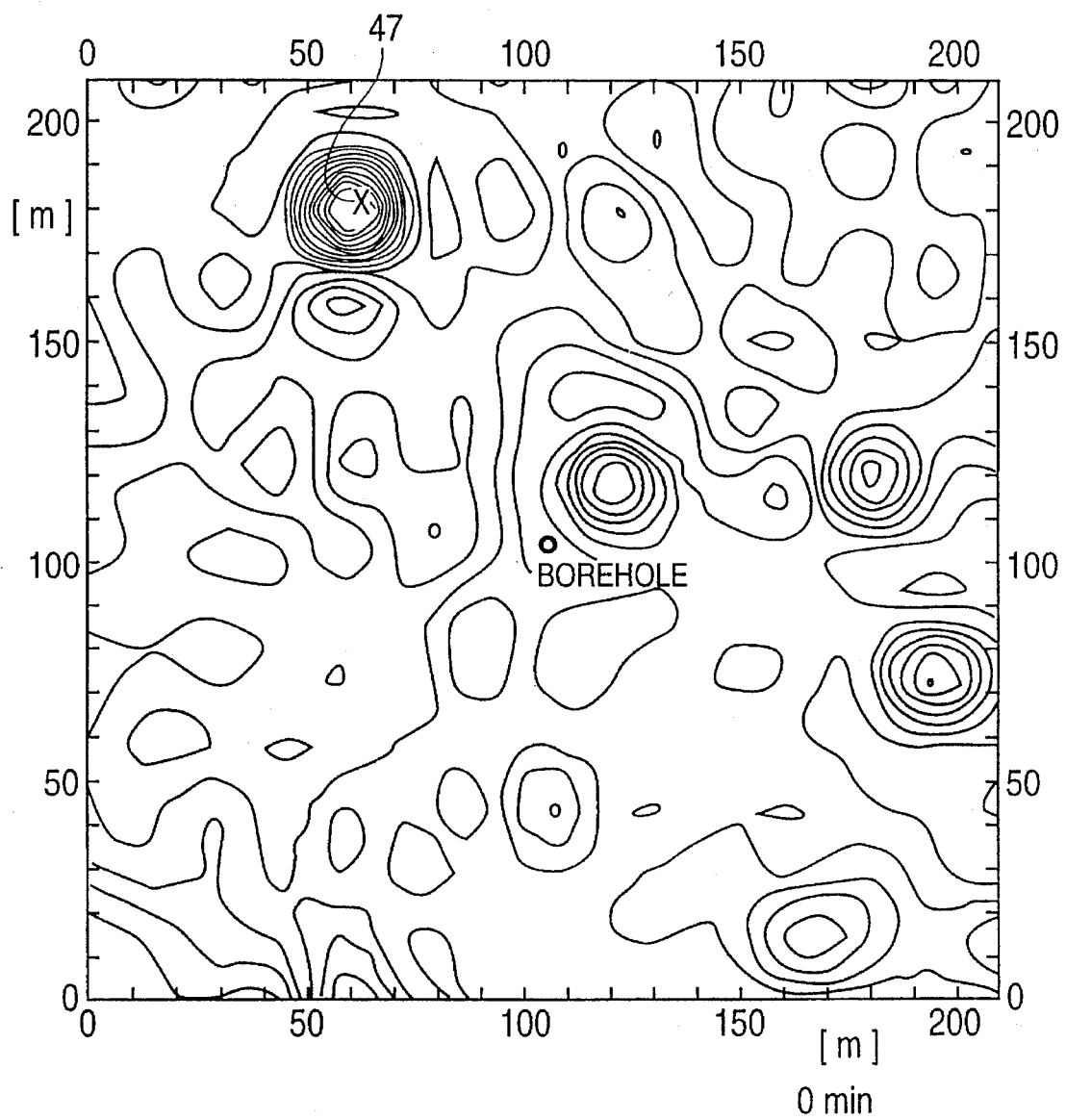

FIG. 6A shows a map-like representation of the surface area of 200 by 200 meters before a fracturing process is carried out. A disturbed probe is at point 47. The figure does not show any preferred distribution of the determined potential values.

Figure 6B:
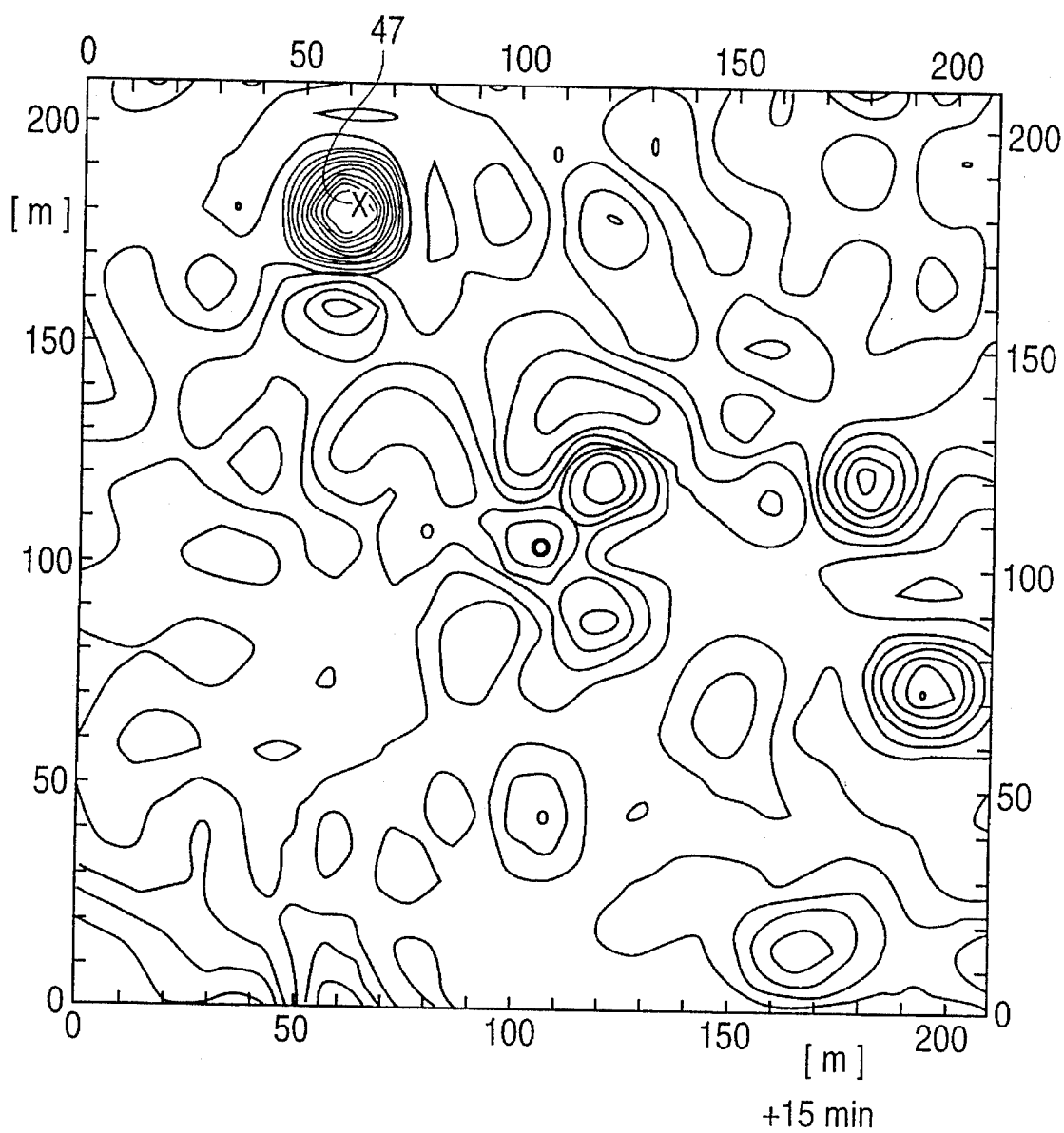

FIG. 6B shows the condition of the potential distribution approximately 15 minutes after initiation of the fracturing process.

FIG. 6C shows the condition of the area after 20 minutes. It is already possible to see an alignment of changed potential values from top left to bottom right.

Figure 6D:
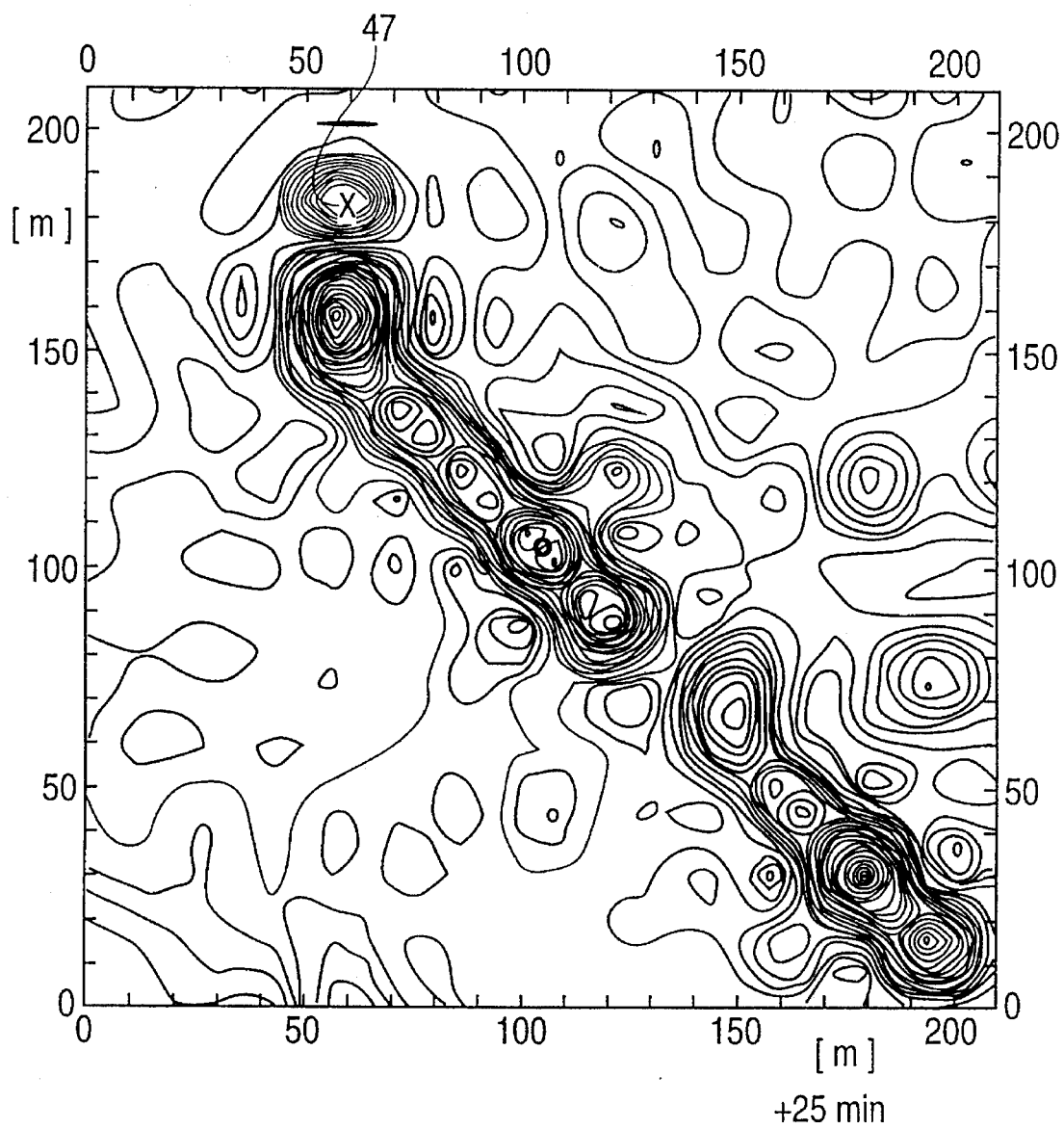
Figure 6E:
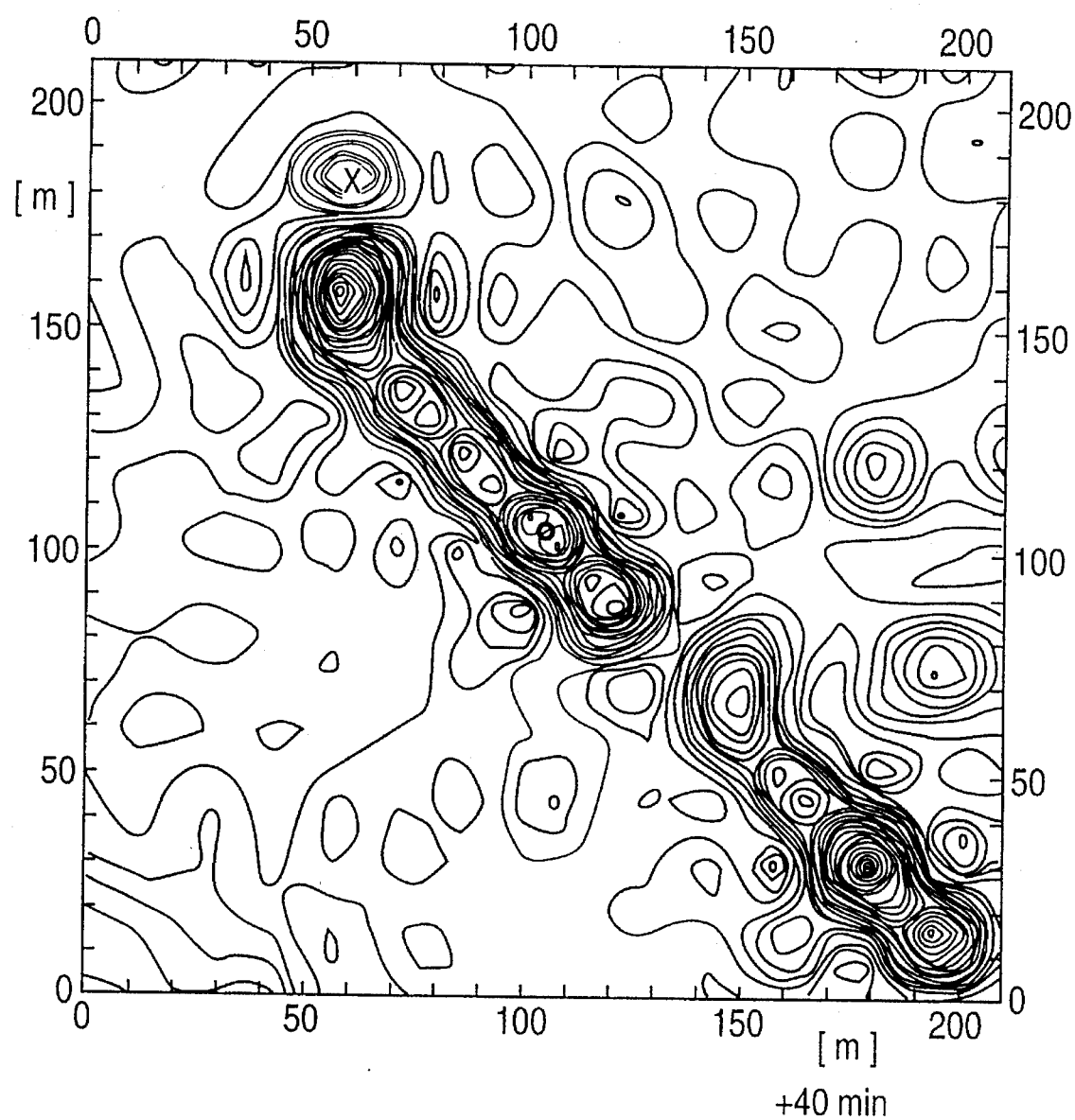
Figure 6F:
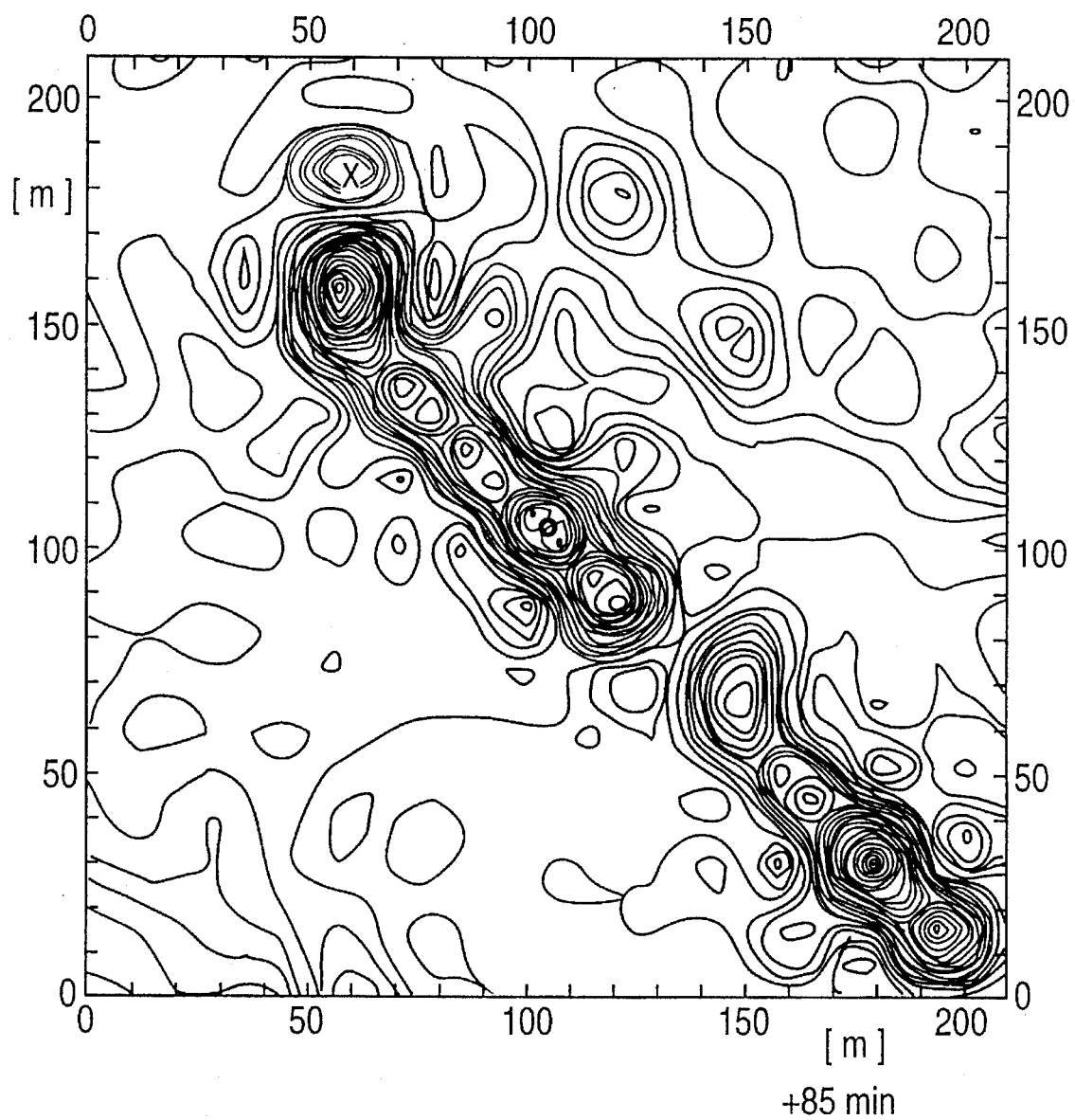
Figure 6G:
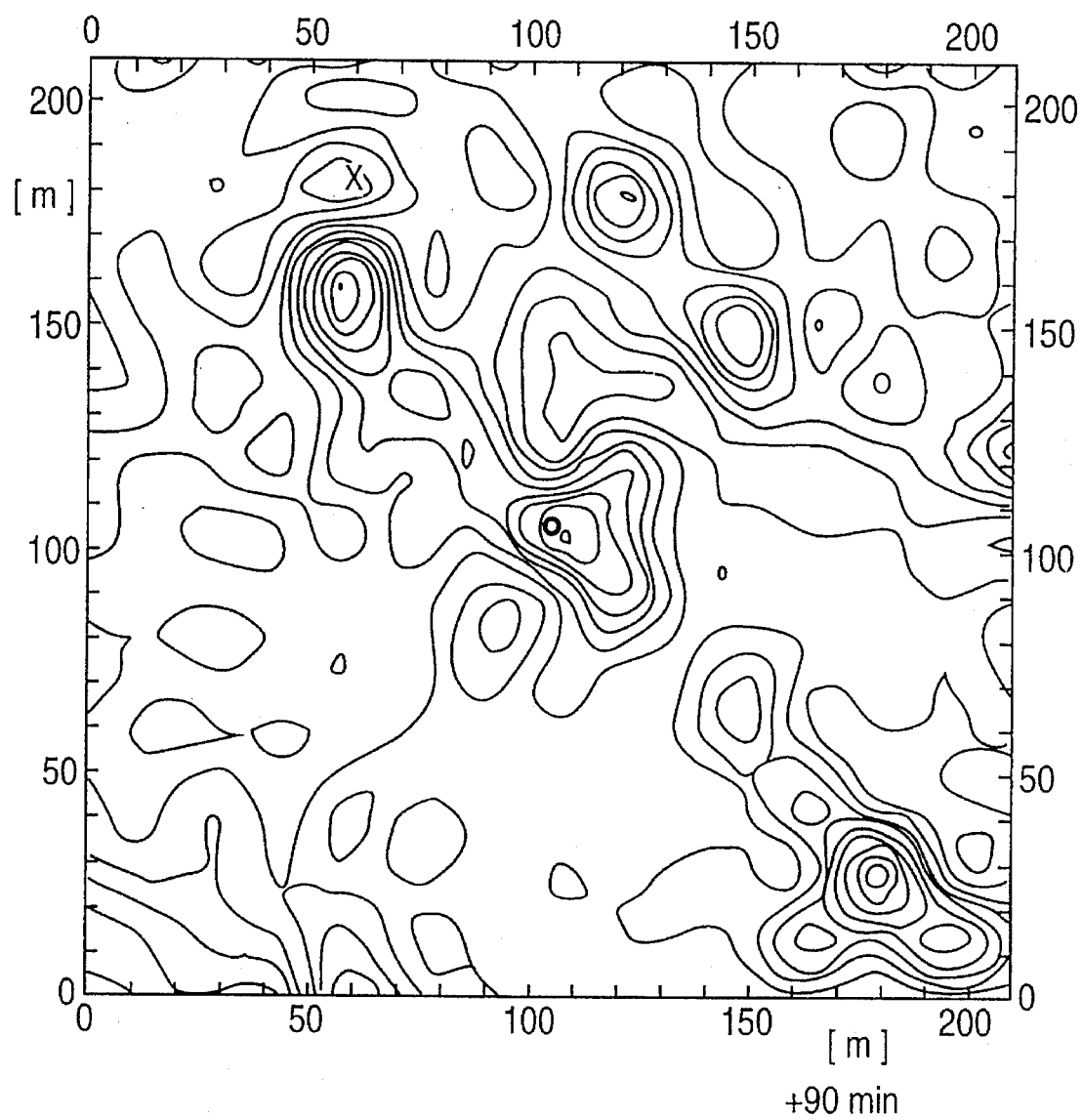
Figure 6H:
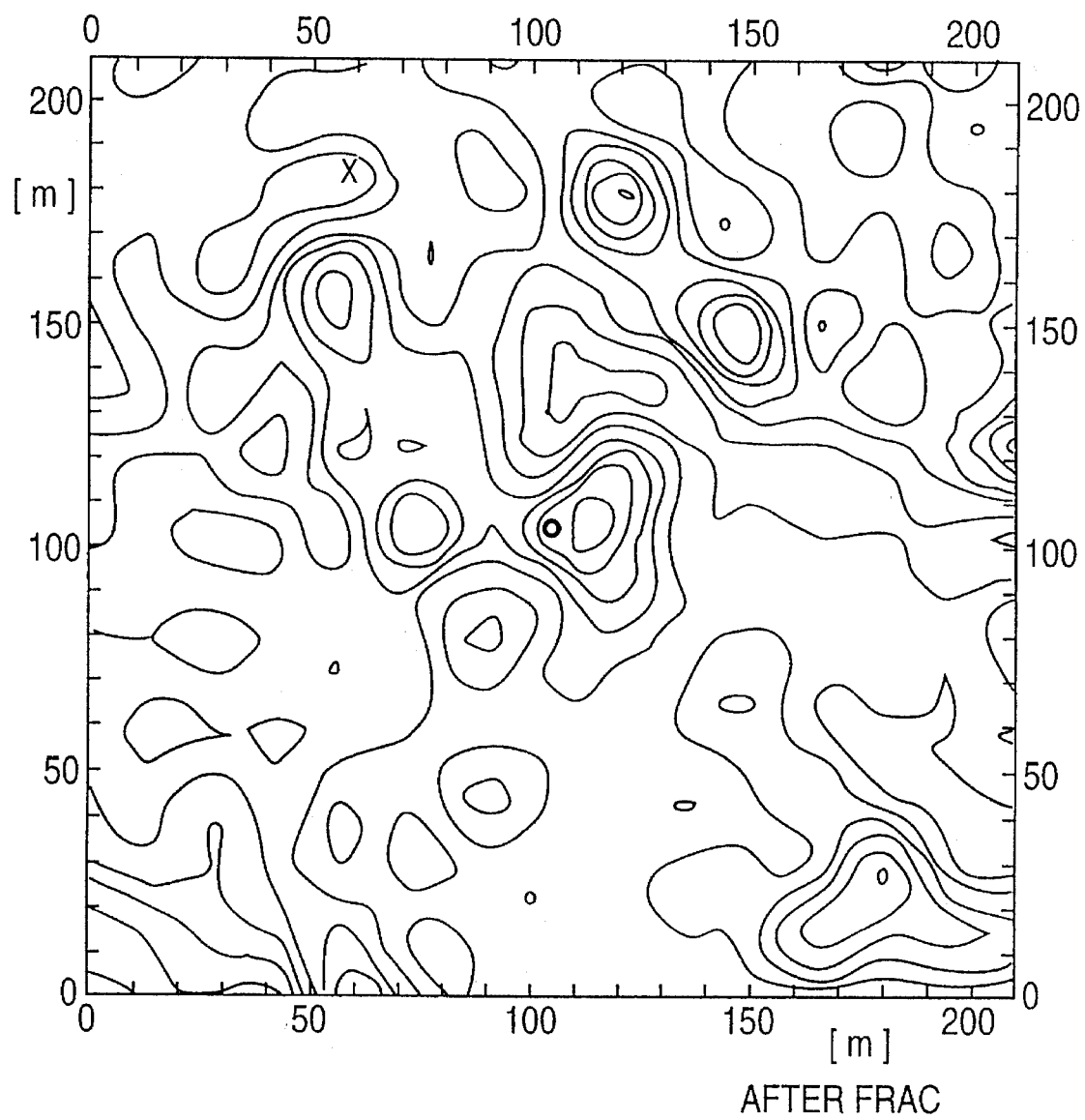

FIG. 6D shows a clear orientation of the potential values after approximately 25 minutes, which orientation lasts until about 85 minutes as shown in FIGS. 6E and 6F. After 90 minutes (FIG. 6G), the presentation changes back toward the original condition (FIG. 6H).

The invention can be used not only for obtaining information on fracture directions and extent but is additionally suitable for obtaining information about ore deposits, for investigating dams and dikes for sealing, for establishing the contours of contaminated ground water in the outlet area from and into dumps, for obtaining information on contamination focuses in the ground, for determining gas/salt water contact in subterranean gas stores and other underground events which influence the potential values at the surface.

A large number of results can be extracted from the data determined since all the data are stored in digital form. In particular, statistical parameters such as the mean value, scatter, standard deviation (for each probe), contours of potential anomalies, etc., can be determined. Furthermore, individual probe profiles can be selected from the overall measurement configuration. Various interpolation methods allow a grid network to be produced. The representations can be produced in the form of iso-line maps or three dimensional representations. The representation can be carried out both in real time and subsequently.

The results can be normalized to specific probes, specific points in time or specific potential values. In principle, there are no limits on the evaluation possibilities.

Commercially available hardware, such as computers based on type 68000 processors, can be used as the central computer.

What we claim is:

1. A method using a central data processor and a plurality of memory units for monitoring an area of the surface of the earth to determine the self potential at a plurality of probes relative to a base probe comprising the steps of embedding a base probe in the surface to be monitored,
embedding a plurality of non-polarizable measurement probes in a grid pattern in the surface to be monitored, interrogating the measurement probes repeatedly to determine measured values of self-potential, repeatedly measuring the earth resistance between pairs of probes including at least one of the measurement probes and the base probe immediately adjacent in time to a measurement of the self-potential at the at least one measurement probe, successive measurements of the earth resistance and of the self-potentials being made between the same probe pairs, each pair of measurement probes being operatively associated with a memory unit, the method further including repeatedly substantially simultaneously detecting and transmitting self-potential values in analog form from the measurement probes to the associated memory unit, buffer storing the transmitted self-potential values in the memory units, measuring the earth resistance between successive measurements of self-potential values, transmitting the earth resistance measurements in analog form to the memory unit, buffer storing the earth resistance measurements in the memory units, converting buffer-stored data from analog to digital form, and repeatedly interrogating the buffer stored data of all probe groups with the central data processor.

2. A method according to claim 1 and including frequency filtering the self-potential values stored in the memory unit.

3. A method according to claim 1 wherein the interrogation time for each group of measurement probes is 0.5 ms.

4. A method according to claim 3 wherein the period between commencement of the interrogation of memory units is less than 10 sec.

5. A method according to claim 1 using apparatus having a measuring circuit with a voltage source and a measurement resistor and wherein the step of measuring earth resistance includes applying a voltage between the base probe and a measurement probe, and detecting the voltage drop across the measurement resistor.

* * * * *